Figure 1:
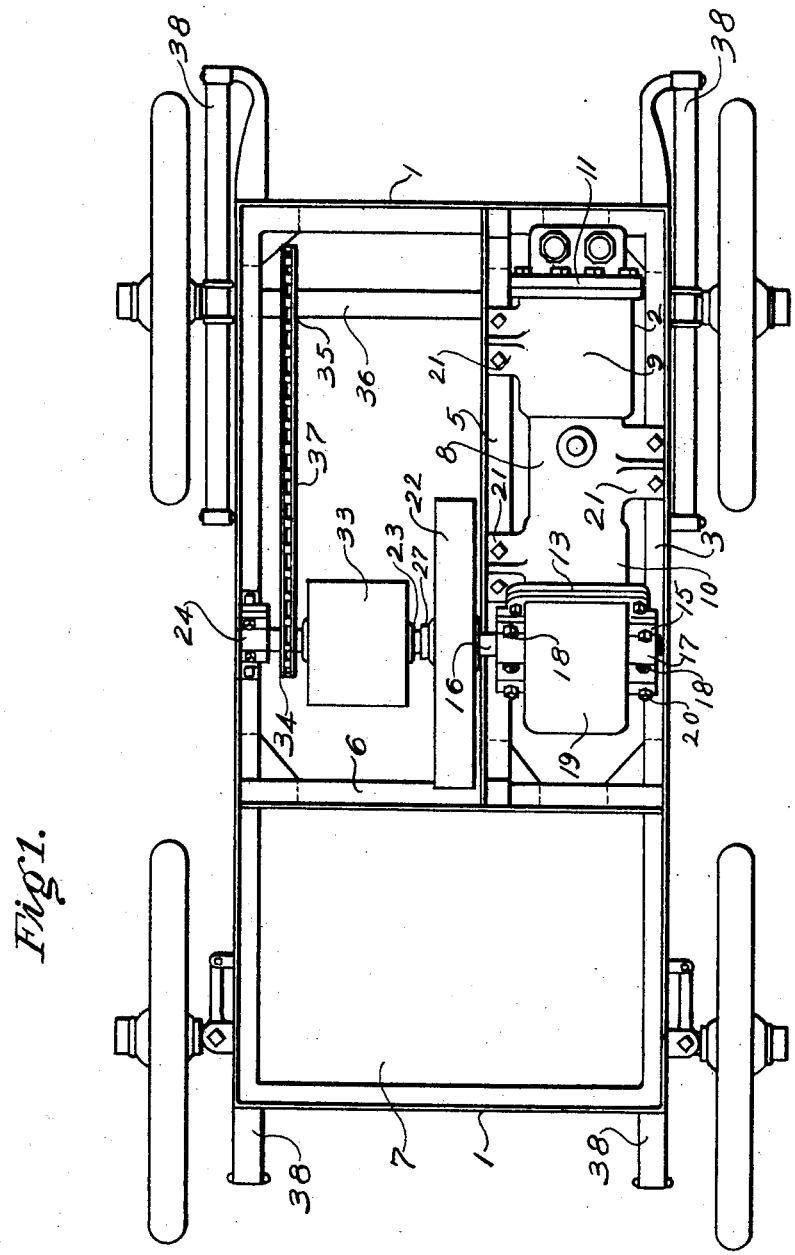

No. 771,565. PATENTED OCT. 4, 1904.
H. NYBERG.
AUTOMOBILE.
APPLICATION FILED SEPT. 13, 1902.
NO MODEL. 2 SHEETS—SHEET 1.

Witnesses: Inventor,
Blanche Michael. Henry Nyberg
Rudow Rummler. by Rummler & Rummler,
his Attorneys.

No. 771,565. PATENTED OCT. 4, 1904.
H. NYBERG.
AUTOMOBILE.
APPLICATION FILED SEPT. 13, 1902.
NO MODEL. 2 SHEETS—SHEET 2.
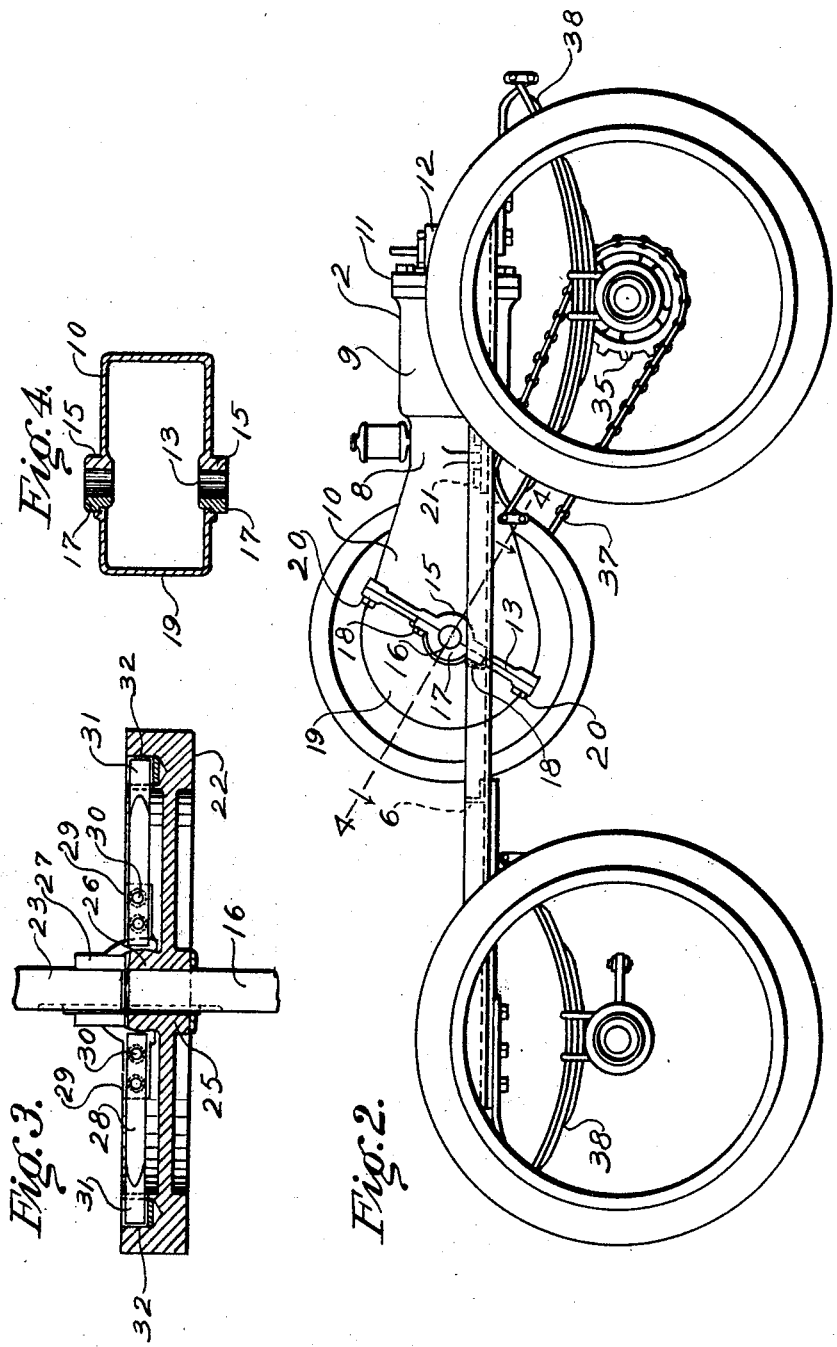

No. 771,565. Patented October 4, 1904.

UNITED STATES PATENT OFFICE.

HENRY NYBERG, OF CHICAGO, ILLINOIS.

AUTOMOBILE.

SPECIFICATION forming part of Letters Patent No. 771,565, dated October 4, 1904.

Application filed September 13, 1902. Serial No. 123,255. (No model.)

*To all whom it may concern:*

Be it known that I, HENRY NYBERG, a citizen of the United States of America, and a resident of Chicago, in the county of Cook and State of Illinois, have invented certain new and useful Improvements in Automobiles, of which the following is a specification.

The main object of my invention is to provide an improved construction and arrangement for the driving mechanism of automobiles, said arrangement being particularly devised for the purpose of overcoming the tendency of the driving mechanism to become strained when the framework of the automobile is racked or twisted, as is the case when same is passing over uneven roads.

A further object is to facilitate the work of removing the main driving-shaft for the purpose of repairing parts of the mechanism connected thereto.

I accomplish these objects by the device shown in the accompanying drawings, in which—

Figure 1 is a top plan of an automobile constructed according to my invention, the superstructure being removed. Fig. 2 is a side elevation of the same. Fig. 3 is a section of the fly-wheel, showing the means for connecting the driving and driven shafts. Fig. 4 is a section of the engine-frame along the line 4 4 of Fig. 2.

In the construction shown the main frame 1 is rectangular in form and is constructed of angle-iron.
The engine 2 in the device shown is a horizontal single-acting gas-engine. This engine is carried by one of the side bars 3 of the frame 1 and by the beam 5, which extends longitudinally within the frame 1. The forward end of the beam 5 is carried by a transverse beam 6. The beams 5 and 6 are also of angle-iron. The part of the frame 1 which is forward of the beam 6 is covered by means of a plate 7.
The main part of the engine-frame is preferably made in the form of a single casting 8, which forms both the cylinder 9 and the crank-chamber 10. The end of the cylinder 9 which is opposite to the crank-chamber is closed by a removable cylinder-head 11, to which are secured the valve-chamber 12 and gas-igniting mechanism. The end 13 of the crank-chamber 10 is open, and its edges lie in a plane which is considerably inclined from a vertical position. Bearings 15 for the main driving-shaft 16 are provided at the end 13 of the crank-chamber. The shaft 16 is secured within the bearings 15 by means of the bearing-caps 17. The plane of separation between the bearings 15 and their caps 17 is sufficiently inclined so that the bearings 15 will support the shaft 16 when the caps 17 are removed. Suitable studs 18 are provided for securing the caps 17 in position. The open end 13 of the crank-chamber 10 is closed by a dust-cap 19, which fits over the caps 17 and is secured in position by the studs 20.

The engine-frame casting 8 is preferably secured to the supporting-frame 1 by means of three projecting flanges or lugs 21, which are securely bolted to the frame 1. Two of the lugs 21 engage the beam 5, which extends between the engine-casting 8 and the fly-wheel 22 and carries the greater part of the weight of the engine and fly-wheel. A driven shaft 23 is journaled at 24 on the supporting-frame 1 and in exact alinement with the driving-shaft 16. The shaft 23 is connected to the adjacent end of the shaft 16 by means of the yielding ball-and-socket connection shown in Fig. 3.

The fly-wheel 22 is carried at the end of the shaft 16 and forms one of the members of said yielding connection. The hub 25 of the fly-wheel 22 on the side adjacent to the shaft 23 is made spherical, forming the ball 26, and fits the inside of the socket member 27, which is rigidly keyed to the shaft 23. The socket member 27 is preferably formed of two parts, which are clamped together over the shaft 23. Flat springs 28 are securely clamped between the flanges 29 of the parts of the socket member 27. The bolts 30 serve the double purpose of securing the parts of the member 27 together and of fastening the springs 28 in place. The outer ends 31 of the springs 28 are seated in slots in the swivels 32 in the rim of the fly-wheel 22.

The gear-casing 33 is mounted on the shaft 23 and contains the gearing for controlling the changes of speed of the vehicle. The construction of the gearing will not be described herein, since it does not form a part of my invention. A sprocket-wheel 34 is rigidly secured to the shaft 23 near the bearing 24 and is connected to a sprocket-wheel 35 on the rear axle 36 by the link belt 37. The frame 1 is connected to the axles of the wheels by means of the springs 28.

The operation of the device shown is as follows: When it is desired to gain access to the crank-chamber for the purpose of examining or repairing the mechanism contained therein, the nuts on the studs 20 are removed. The dust-cap 19 may then be readily removed without disturbing the shaft 16 or any of the connections between the engine-frame 8 and the supporting-frame 1. If it becomes necessary for any reason to remove the shaft 16, the cap 17 will be removed and the shaft 16 lifted from its position. It will thus be seen that no repairs of the mechanism connected with the main driving-shaft or within the gear-casing 33 will necessitate the disconnection of the engine from its supporting-frame.

When a vehicle of this class passes over a rough road, it is impossible to avoid temporary twisting and racking of the rectangular frame 1. Such racking would produce severe strains upon the driving-shaft if the same were made in one piece and connected to the engine and to the supporting-framework by rigid bearings, as is the usual practice. Such strains soon result in the crystallization of the shaft and the consequent unexpected breaking of same. When the frame 1 is racked in an automobile constructed according to my invention, such twisting of the shaft is avoided by the yielding of the flexible joint which connects the shafts 23 and 16. It will be seen that if the shafts 23 and 16 are moved slightly out of alinement with each other the socket member 27 will slip over the ball member 26, and the springs 28 will yield sufficiently to compensate for such change in the alinement of the shafts 16 and 23.

It will be seen that numerous details of the construction shown may be altered without departing from the spirit of my invention. I therefore do not confine myself to such details, except as hereinafter limited in the claims.

What I claim as my invention, and desire to secure by Letters Patent, is—

1. In an automobile, the combination of a supporting-frame mounted on a pair of axles; an engine-frame rigidly secured to said supporting-frame; a driving-shaft journaled in said engine-frame; said engine-frame being separable on a plane extending through the axis of said driving-shaft in suitable manner to permit the removal of said driving-shaft without disturbing the connection between said engine-frame and supporting-frame; a fly-wheel rigidly secured to one end of said driving-shaft; a driven shaft mounted in alinement with said driving-shaft, and having its end which is opposite to said driving-shaft journaled on said frame; a ball-and-socket joint connecting the adjacent ends of said shafts; suitable yielding connection between said driven shaft and said fly-wheel; and suitable mechanism connecting said driven shaft with one of said axles, substantially as described.

2. In an automobile, the combination of a supporting-frame mounted on a pair of axles; an engine-frame rigidly secured to said supporting-frame; a driving-shaft journaled in said engine-frame; said engine-frame being separable on a plane extending through the axis of said driving-shaft in suitable manner to permit the removal of said driving-shaft without disturbing the connection between said engine-frame and supporting-frame; a fly-wheel rigidly secured to one end of said driving-shaft; the driven shaft mounted in alinement with said driving-shaft, and having its end which is opposite to said driving-shaft journaled on said frame; a ball-and-socket joint connecting the adjacent ends of said shafts; a radially-disposed spring-arm having its inner end rigidly secured to said driven shaft and having its outer end slidably engaging a slot in the rim of said fly-wheel; and suitable mechanism connecting said driven shaft with one of said axles, substantially as described.

3. In an automobile, the combination of a supporting-frame mounted on a pair of axles; an engine-frame rigidly secured to said supporting-frame; a driving-shaft journaled in said engine-frame; a fly-wheel rigidly secured to one end of said driving-shaft; a driven shaft mounted in alinement with said driving-shaft, and having its end which is opposite to said driving-shaft journaled on said frame; a ball-and-socket joint connecting the adjacent ends of said shafts; suitable yielding connection between said driven shaft and said fly-wheel; and suitable mechanism connecting said driven shaft with one of said axles, substantially as described.

4. In an automobile, the combination of a supporting-frame mounted on a pair of axles; an engine-frame rigidly secured to said supporting-frame; a driving-shaft journaled in said engine-frame; a fly-wheel rigidly secured to one end of said driving-shaft; a driven shaft mounted in alinement with said driving-shaft, and having its end which is opposite to said driving-shaft journaled on said frame; a ball-and-socket joint connecting the adjacent ends of said shafts; a radially-disposed spring-arm having its inner end rigidly secured to said driven shaft and having its outer end slidably engaging a slot in the rim of said flywheel; and suitable mechanism connecting said driven shaft with one of said axles, substantially as described.

Signed at Kenosha, Wisconsin, this 23d day of August, 1902.

HENRY NYBERG.

Witnesses:
PETER FISHER,
JAMES E. TULLY.